United States Patent
Moore et al.

[11] Patent Number: 6,147,863
[45] Date of Patent: Nov. 14, 2000

[54] INDUSTRIAL COMPUTER

[76] Inventors: Ronald L. Moore; Thomas T. Rittmaster, both of 6260 Sequence Dr., Suite "A", San Diego, Calif. 92121

[21] Appl. No.: 08/986,009

[22] Filed: Dec. 5, 1997

[51] Int. Cl.⁷ .................................. G06F 1/16; H05K 1/14
[52] U.S. Cl. ........................... 361/686; 361/788; 361/803
[58] Field of Search .................................. 361/686, 684, 361/784, 803, 788

[56] References Cited

U.S. PATENT DOCUMENTS

| | | | |
|---|---|---|---|
| 4,237,546 | 12/1980 | Wells | 361/684 |
| 4,511,950 | 4/1985 | Bunner et al. | 361/788 |
| 4,947,288 | 8/1990 | Olsson et al. | 361/788 |
| 5,051,982 | 9/1991 | Brown et al. | 370/58.2 |
| 5,305,183 | 4/1994 | Teynor . | |
| 5,311,397 | 5/1994 | Harshberger et al. . | |
| 5,396,400 | 3/1995 | Register et al. . | |
| 5,437,014 | 7/1995 | Busboom et al. | 395/275 |
| 5,455,927 | 10/1995 | Huang . | |
| 5,546,563 | 8/1996 | Chuang . | |
| 5,551,012 | 8/1996 | Chuang et al. . | |
| 5,568,360 | 10/1996 | Penniman et al. . | |
| 5,572,688 | 11/1996 | Sytwu | 395/309 |
| 5,673,174 | 9/1997 | Hamirani . | |
| 5,781,747 | 7/1998 | Smith et al. | 395/309 |
| 5,796,729 | 8/1998 | Greaney et al. | 370/345 |
| 5,822,197 | 10/1998 | Thuault | 361/804 |
| 5,852,725 | 12/1998 | Yen | 361/784 |

*Primary Examiner*—Leo P. Picard
*Assistant Examiner*—Lisa Lea-Edmonds
*Attorney, Agent, or Firm*—Thomas J. Tighe

[57] ABSTRACT

An industrial computer including a passive backplane generally compliant with the PCI/ISA industrial standard promulgated by the PICMG technical committee, but with certain exceptions. One exception being that the plug-in CPU card has been replaced by a plug-in "feature" card which includes features normally found on prior art CPU cards but not the microprocessor. Also the in-line ISA and PCI backplane connectors used for conventional CPU cards have been replaced by preferably two in-line SECC connectors for the feature card. In the preferred embodiment a third SECC connector is used to connect a PENTIUM II to the backplane, and a further connector is used to connect the PENTIUM II's voltage regulator module to the backplane. All communications between the processor, feature card, voltage regulator module, and backplane I/O buses are via signal lines in or on the backplane. This invention allows the entire CPU and associated features to be quickly swappable in case of malfunction.

15 Claims, 5 Drawing Sheets

INDUSTRIAL COMPUTER

BACKGROUND OF THE INVENTION

This invention relates in general to microprocessor based computers specially designed for use in industrial applications and mission-critical environments, and in particular to such having passive I/O (input/output) backplanes into which is plugged a microprocessor based, single-board computer, i.e. a "CPU card", and in particular to such passive backplanes which have signal lines and connectors for coupling peripherals to a plugged-in CPU card according to I/O bus standards commonly found in INTEL PENTIUM based personal computers, e.g. I/O buses conforming to the ISA (industry standard adapter) and PCI (peripheral component interconnect) standards.

This invention particularly addresses a problem that has arisen in the PICMG (PCI Industrial Computer Manufacturers Group) industry with the introduction of the INTEL PENTIUM II, the "PICMG industry" being the makers and users of industrial and mission-critical computers that are compliant with the PICMG specification for industrial PCI/ISA passive backplanes and CPU cards. Due immediately the size, weight and form of the PENTIUM II and its mounting and cooling hardware, it should not be mounted on a conventional PICMG CPU card.

The development of PICMG computers based on passive backplane technology has been driven by the needs of the industrial and Computer-Telephony Integration (CTI) markets. Personal computers designed for desktop use are based on motherboard architectures which fail to address a number of important requirements for industrial and CTI use. For example, a motherboard structure is inflexible and may require the replacement of the entire motherboard in order to repair or to upgrade the system. This results in long system downtime which may be tolerable in a system used for office applications, but which is totally unacceptable in a system which controls the core processes on which a manufacturing business depends.

Also, many industrial and CTI applications require a large number of expansion slots for real-world I/O or speech cards. These are not available on motherboard-based computers. Additionally, the overall construction of the motherboard and I/O expansion board system is not designed to cope with the harsh environmental demands of many industrial applications.

A passive-backplane architecture solves these problems by completely dispensing with the motherboard. In a passive backplane computer, a system bus is used to couple a plug-in CPU card with a plurality of plug-in add-on cards. This architecture makes rapid repair by card substitution possible, and system upgrades and changes are greatly simplified, with minimum system downtime. With a passive backplane there is also considerable capacity for system expansion, and the rugged construction of a typical passive backplane system provides reliable operation in an industrial environment.

Because of the advantages of a passive backplane and a plug-in CPU card, and because there was no configuration standard for PCI buses, a group of industrial computer product vendors, with a long history of developing PC architecture products for industrial use joined forces, and in 1994 they established the PCI Industrial Computer Manufacturers Group (PICMG) with the mission to define an industrial PCI/ISA passive backplane and CPU card interface specification. The result was a comprehensive specification for a passive backplane architecture to support both PCI and ISA I/O buses, the PCI/ISA industrial standard.

The PCI/ISA industrial standard specifies the logical and mechanical interface between the CPU card and the passive backplane. Instead of using a redesigned edge connector for the CPU card, the PICMG technical committee chose a physical board format and connector based on the ISA adapter specification and added a PCI connector below, and in line with, the ISA connector, allowing sufficient space for 32-bit or 64-bit PCI interfaces. Thus a prior art PICMG CPU card and backplane physical connection consists of an ISA connector in line with a PCI connector.

Prior art PICMG CPU cards typically include a microprocessor, e.g. a PENTIUM microprocessor, and certain features, for example: read only memory (ROM), random access memory (RAM), a video controller, some I/O controllers and connectors, a video controller, and a processor "chip set" which controls and times communications between the microprocessor and the other components of the card and the backplane I/O buses. Conventionally a PICMG backplane is oriented horizontally, i.e. face up, in a rack-mounted frame and the CPU card plugs vertically into the backplane. When plugged-in, the CPU card is coupled to a plurality of additional ISA and PCI connectors, via the backplane, for communicating with add-on cards. A CPU card plugged into a passive backplane can be swapped out very quickly as opposed to the difficulty of swapping out a PC motherboard. This fast CPU swappability is a major advantage of a PICMG computer.

With the advent of the PENTIUM II microprocessor and its much larger overall outline and mass, mounting a PENTIUM II on a vertically-installed CPU card creates special problems. The new SECC (Single Edge Contact Cartridge) connector used to edge mount the PENTIUM II is a wide variant from conventional on-board processor sockets, and because of power dissipation specifications of approximately 35 Watts, the PENTIUM II requires a massive heat sink and cooling system. Incorporating the PENTIUM II into an industrial file or communication server without the Intel recommended cooling fan and heat sink, or other properly engineered cooling system, would be inviting disaster. However with the INTEL recommended fan and heatsink combination, the PENTIUM II and its associated hardware weighs more than one-half pound (11 oz) and is about 24 cubic inches in volume (5.5" L×1.75" D×2.5" H). Also per an INTEL product information sheet, specified fan/heatsink supports must be used, whether the processor has an active or a passive fan/heatsink. Therefore, to use a PENTIUM II in the industrial arena, provisions must be made for mounting and supporting the PENTIUM II with its associated hardware to ensure reliable operation under industrial conditions of shock and vibration as well as to insure survival during normal shipment or transport.

For all these reasons, mounting a PENTIUM II on a CPU card that is plugged vertically into an edge connector, as has been the PICMG method, is not acceptable. Special bracing would be needed to prevent damage due to stress caused by the mass combined with a center of gravity so far from the board. Long term stress would likely cause damage but also if the unit is dropped, the moment of force created by the large PENTIUM II and its associated hardware could easily cause fractures in leads and solder joints.

This invention is a solution to these problems. This invention has a passive backplane, a feature card, a PENTIUM II, and a voltage regulator module (VRM). Connectors on the backplane allow the PENTIUM II, the feature card and the VRM to be plugged into the backplane separately. The feature card contains features such as memory, processor chip set, and I/O currently found on typical PICMG CPU cards. The PENTIUM II is not mounted on a plug-in card. It is vertically plugged into the backplane so that support means beyond the INTEL recommended retaining hardware are not necessary. Likewise, the VRM is vertically plugged into the backplane with traces in the backplane connecting the feature card, VRM and PENTIUM II as necessary. With this design the entire CPU and associated features can be quickly swapped out as in prior art PICMG computers, the difference being that they reside in three pieces, each separately plugged into the backplane.

Having the PENTIUM II separately pluggable into the backplane is advantageous in other ways. It permits the proper orientation and support of the processor as well as providing sufficient room for cooling air flow. The GTL+ bus permits the routing of the processor signals up from the backplane without signal degradation due to the incorporated termination scheme. It permits critical placement of the PENTIUM II, VRM and feature card on the backplane to ensure signal integrity and minimal power loss by minimizing and simplifying the routing and power distribution of the GTL+ bus and the power planes. Mean time to repair (MTTR) does not suffer because there are no more active components "soldered down" to the backplane than in any single board computer design. The processor, the VRM and the feature set are all in sockets designed for withstanding industrial and commercial applications.

Other advantages and attributes of this invention will be readily discernable upon a reading of the text hereinafter.

SUMMARY OF THE INVENTION

An object of this invention is to provide an industrial computer having a passive backplane and a readily swappable centrally processing unit.

A further object of this invention is to provide such an industrial computer in which the readily swappable CPU comprises a PENTIUM II microprocessor and its associated circuitry and support hardware.

A further object of this invention is to provide a PICMG type computer with a passive backplane and CPU components comprising a microprocessor, a voltage regulator module and a connector mountable feature card, each separately and removably plugged into the backplane.

A further object of this invention is to provide a PICMG type computer with a passive backplane having two in-line SECC connectors for coupling a feature card thereto and an adjacent SECC connector for coupling a PENTIUM II processor thereto.

A further object of this invention is to provide an industrial computer with a horizontally mounted, passive backplane which includes a plurality of connectors interconnecting a PENTIUM II processor, a feature card, a voltage regulator module, and at least one I/O bus on the backplane.

These objects, and other objects expressed or implied in this document, are accomplished by a computer comprising a feature card, a microprocessor (e.g. a PENTIUM II), and a backplane which includes: at least one I/O bus (e.g. an ISA and/or PCI bus), a feature card connector, a microprocessor connector, and signal lines operatively coupling the microprocessor and the feature card to each other and to the I/O bus. Preferably the connectors have a higher signal density than a PCI connector. In the preferred embodiment SECC (slot 1) connectors are used: one for the processor and two in-line for the feature card. One of the in-line connectors couples the feature card and the processor while the other in-line connector couples the feature card and the backplane I/O bus or buses. Preferably the feature card includes some or all the features found on prior art CPU cards, except the microprocessor which is plugged into the backplane for quick swappability.

DESCRIPTION OF THE PREFERRED EMBODIMENT

Figure 1:
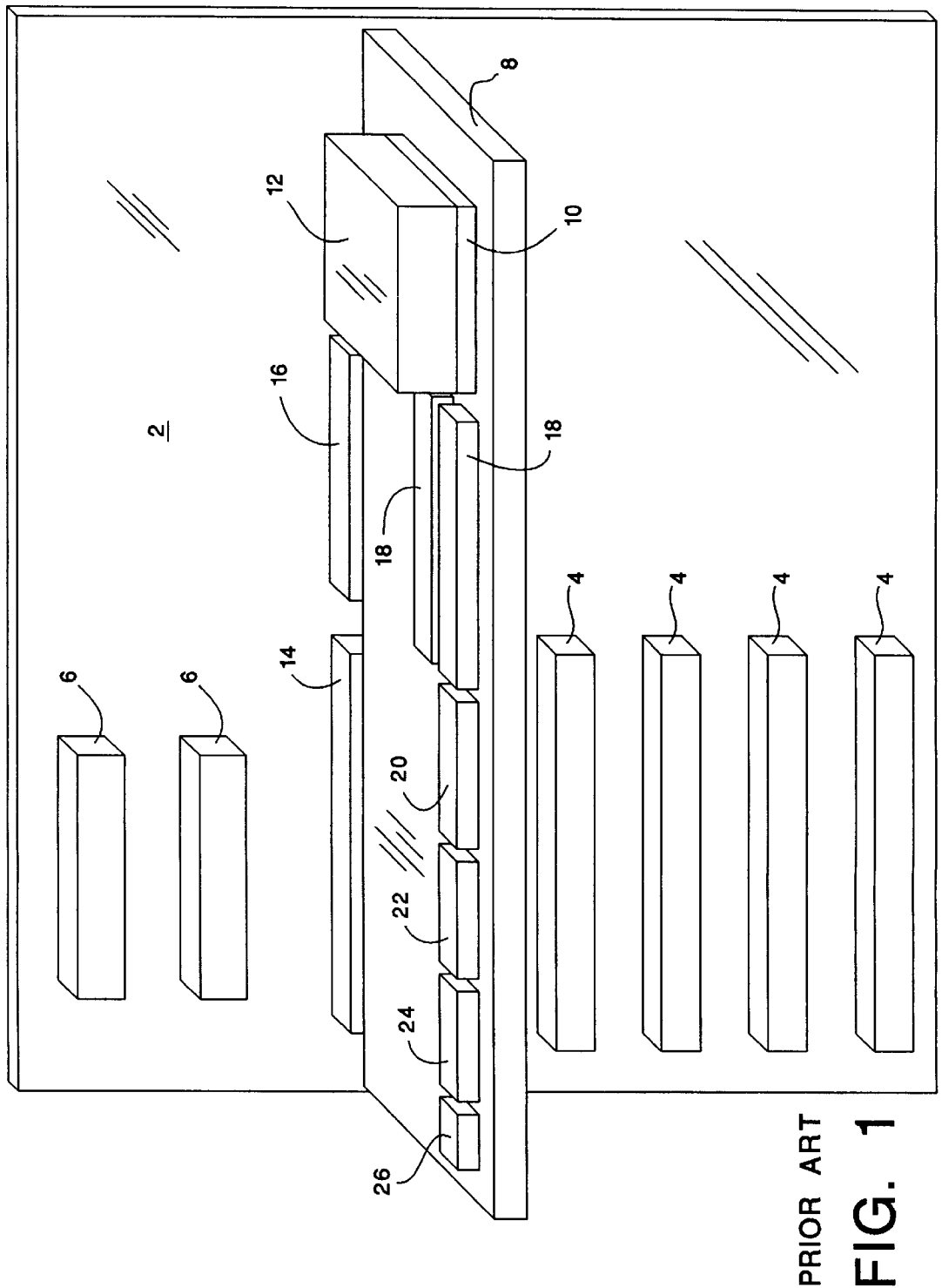
FIG. 1 is a pictorial diagram illustrating prior art.

Referring to FIG. 1, a prior art passive backplane 2 is shown to include a plurality of conventional ISA connectors 4 and a plurality of PCI connectors 6. Also shown is a CPU or card 8 with a microprocessor 10 and fan 12 mounted thereon. The CPU card is plugged into both a conventional ISA connector 14 and a conventional PCI connector 16 per the PICMG standard. The backplane is usually mounted in a rack mountable chassis (not shown). The CPU card is basically a single board computer with a microprocessor and commonly included features such as DIMM or SIMM connectors 18 for processor RAM memory, on-board I/O controllers and connectors for communicating with peripherals such as hard disks, floppy disks, printers and communications channels (20, 22, 24 and 26 respectfully), control circuitry commonly referred to as a "processor chip set" (not shown), and associated oscillators and support circuitry (not shown).

An example of a prior art PICMG single board computer is the model SB21064N300 sold by INDUSTRIAL COMPUTER SOURCE. An example of the passive backplane 2 is the backplane found in a rack mounted chassis, model 7310-24V, sold by INDUSTRIAL COMPUTER SOURCE.

Single board computers plugged into essentially passive backplanes are especially advantageous in critical mission environments because in case of failure the CPU and all its associated features can be replaced by simply swapping a card, whereas in a conventional personal computer it is a time consuming and difficult process to replace a motherboard.

Figure 2:
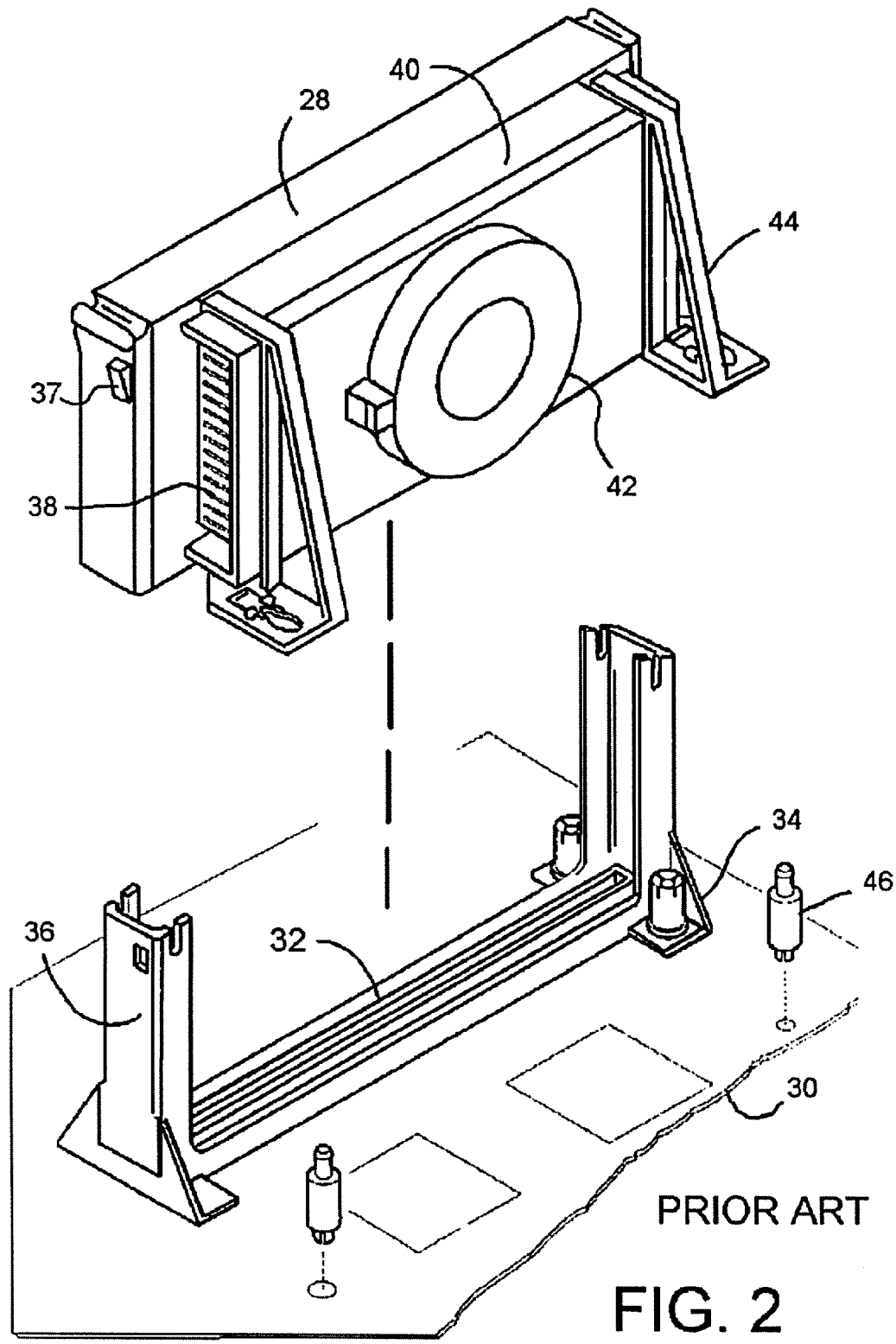
FIG. 2 is a pictorial, exploded view of a PENTIUM II microprocessor mounted on a printed circuit board.

Referring to FIG. 2, a PENTIUM II microprocessor 28 is connected to a printed circuit board 30 by being plugged into an SECC (Single Edge Contact Cartridge) connector 32 (commonly called a "slot 1" connector) that is nested in a retention mechanism 34 which has a pair of opposing, upright guide 36 arms for guiding the microprocessor's mating connector (not shown) into the SECC connector. There is also a spring-loaded latch 37 for locking the processor in place once it is seated. Typically, and as recommended by INTEL, abutting the PENTIUM II is a heatsink 38 and attached to the heatsink is a cooling fan shroud 40 and fan 42. As mounted on the circuit board, the combination is supported by a pair of buttresses 44 which clip onto the heatsink and are secured to the printed circuit board by a pair of retention pegs 46. As can be seen, the mounted PENTIUM II with its heatsink, fan shroud and fan constitute a considerable mass extending perpendicularly from the board. As previously explained, this mass would present a considerable structural problem if it were mounted as shown in FIG. 1 on a CPU card. Typically the combination weighs about 11 ounces, and when projecting horizontally from a vertically oriented card has a torque arm of about 1.6 inch-pounds (assuming a centrally located center of gravity). This not only continually stresses the card and the backplane connector into which the card is plugged, but if the rack in which the backplane is mounted is dropped or otherwise vertically jarred, the mass could fracture the card, or worse yet create cold solder joints.

Figure 3:
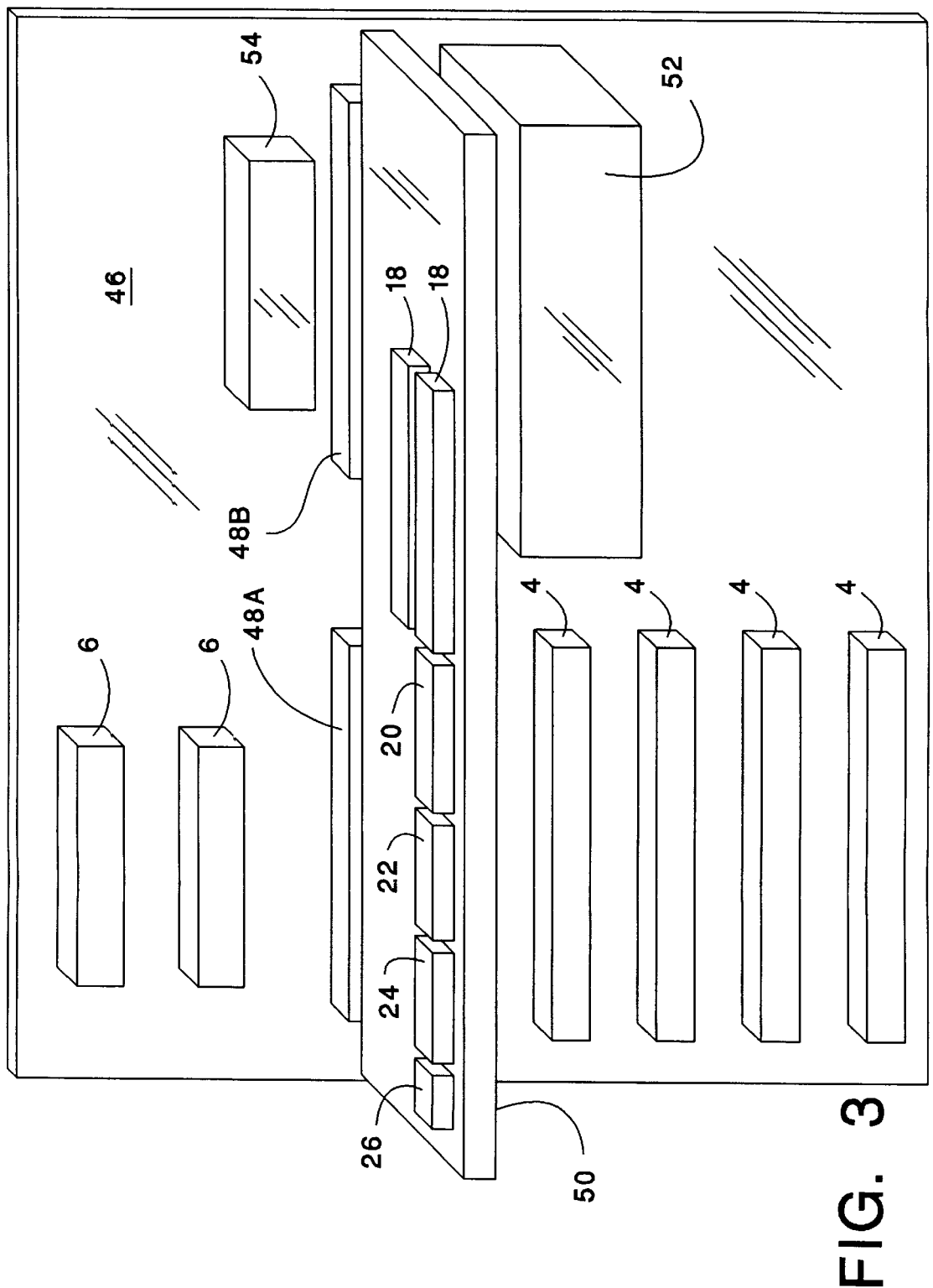
FIG. 3 is a pictorial diagram illustrating the invention described herein.

Referring to FIG. 3, this invention presents a passive backplane 46 that provides a plurality of ISA connectors 4 and PCI connectors 6 as in the prior art, but in place of the in-line ISA and PCI connectors for connecting a conventional CPU card, it includes a pair of in-line SECC connectors, 48A and 48B, for coupling a "feature" card 50. The feature card is so named because it contains features commonly found on prior art CPU cards, including processor memory, but does not include the microprocessor. The backplane 46 also has an SECC connector (not shown) for coupling a PENTIUM II 52, with its heatsink, fan shroud and fan, as illustrated in FIG. 2. The backplane also provides a connector (not shown) for coupling a voltage regulator module 54 needed by the PENTIUM II.

Figure 4:
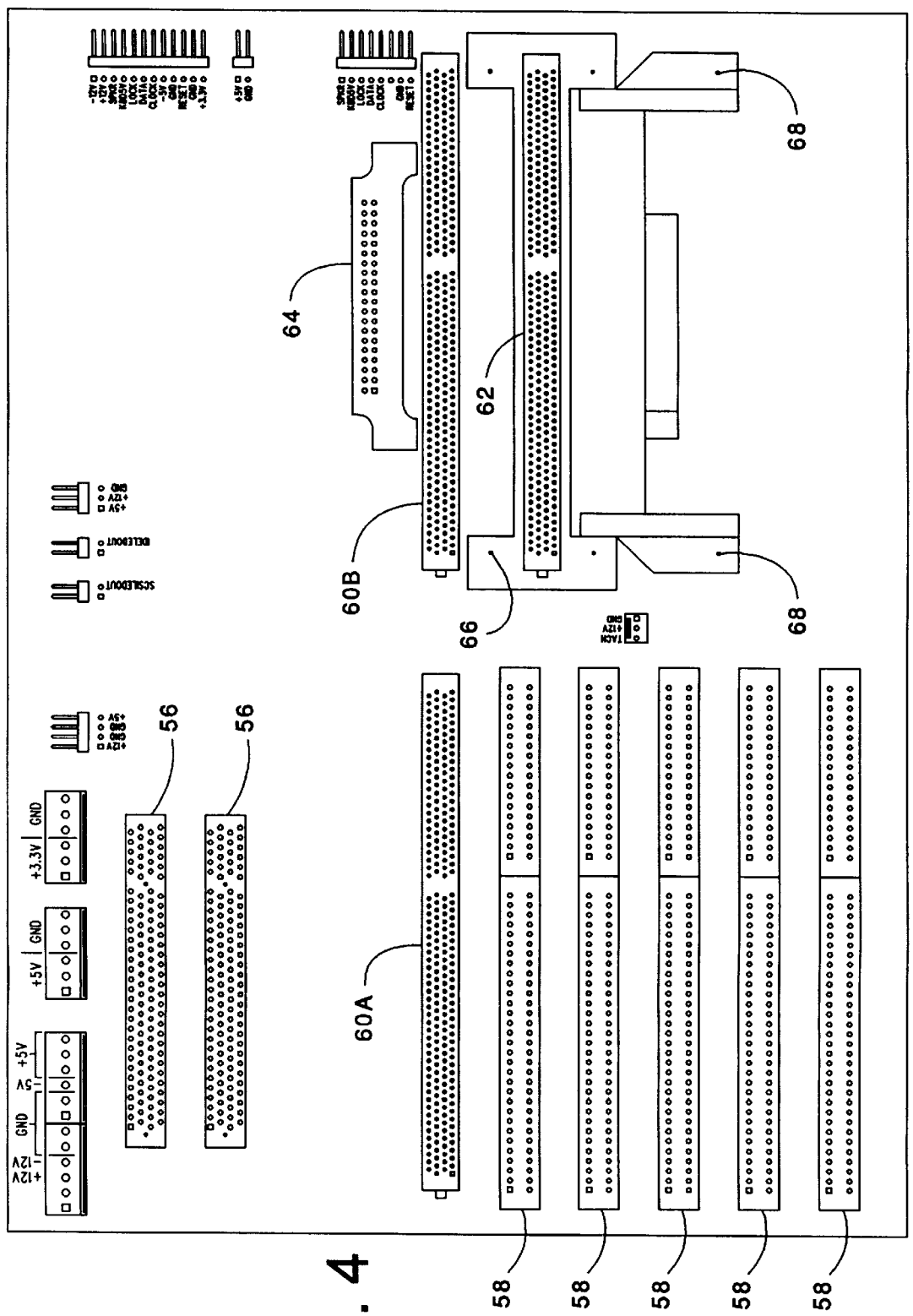
FIG. 4 is a plan view of an exemplary backplane according to this invention.

Referring to FIG. 4, an exemplary backplane according to this invention is illustrated to have a plurality of PCI connector footprints 56, each footprint being a set of holes defined by the backplane for coupling the base connecting pins of a PCI connector to signal tracings on or within the backplane. The backplane also has a plurality of ISA footprints 58. The backplane also defines two in-line footprints for the SECC connectors, 60A and 60B, the connectors into which the feature card is plugged. The backplane also defines a footprint 62 for the SECC connector into which the PENTIUM II plugs, and a footprint 64 for its voltage regulator module. The backplane also defines four holes 66 for mounting the PENTIUM II retention mechanism (36 in FIG. 2) and a pair of holes 68 for mounting the retention pegs (46 of FIG. 2) to which the buttresses connect.

Figure 5:
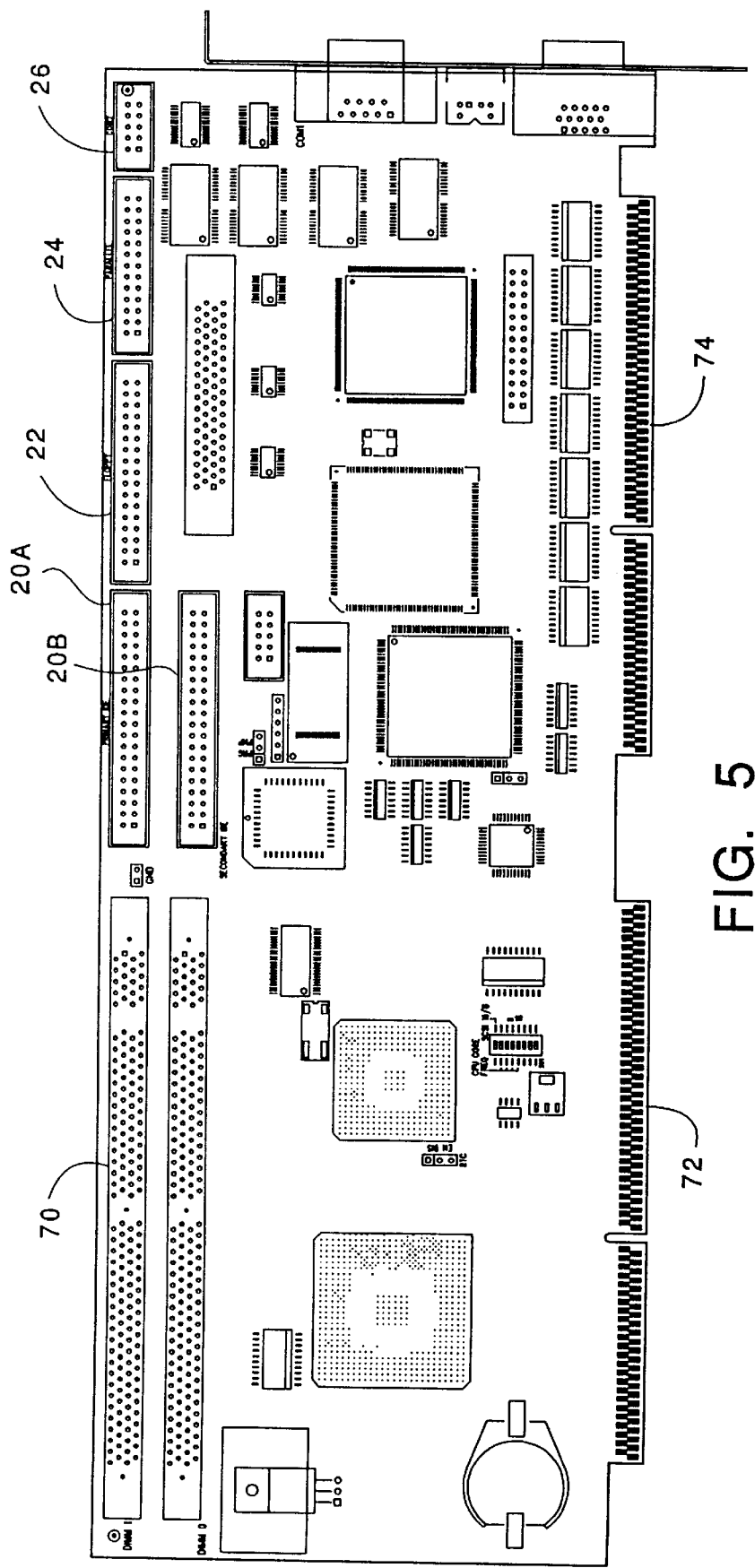
FIG. 5 is a plan view of an exemplary feature card according to this invention.

Referring to FIG. 5, an exemplary card feature 70 is illustrated to have a pair of DIMM connectors for coupling SDRAM therein for providing random access memory to the PENTIUM II. The signal path between the DIMM connectors and the PENTIUM II is via the edge connector 72 which mates with the SECC connector 60B (FIG. 4) of the backplane. There is significant advantage in using an SECC connector to couple the DIMM modules to the backplane, and hence to the PENTIUM II, because there is generally a one-to-one interconnect between the adjacent SECCs resulting in shorter, uniform interconnect leads and better impedance control. The feature board also is illustrated to have the controllers and connectors for communicating with I/O, namely a communication connector 26, a parallel printer connector 24, a floppy disk connector 22, and one or more IDE connectors, 20A and 20B, for communicating with hard drives. The feature board can also have a SCSI connector and video controller as well. Also illustrated are various integrated circuits (undesignated) comprising the processor chip set and its supporting circuitry. The feature board also has another edge connector 74 which plugs into the SECC connector 60A (FIG. 4) for communicating with the ISA and PCI buses on the backplane. This second SECC is advantageous because of the high density of signals between the feature card and the PCI and ISA buses. Because the prior art has an on-board processor, it has two connectors, the in-line ISA and PCI connectors, to handle the density.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims. For example, the passive backplane of this invention could include bridge circuits for expanding the number of PCI connectors or ISA connectors, circuits which increase the load capacity of a bus. As another example, the feature card according to this invention does not necessarily include any on-board I/O controllers or connectors, nor a video/display controller or connector, since these devices can be incorporated via add-on cards plugged into the backplane's ISA or PCI buses.

We claim:

1. A computer for use in industrial and mission critical environments comprising:

(a) a feature card comprising:
       (1) microprocessor memory,
       (2) a microprocessor chip set,
       (3) but not a microprocessor;

(b) a microprocessor, separate from the feature card, pluggable into a Single Edge Contact Cartridge connector; and (c) a passive backplane comprising:
       (1) an input/output bus,
       (2) means for removably connecting the feature card to the backplane,
       (3) a Single Edge Contact Cartridge connector for removably connecting the microprocessor to the backplane, and
       (4) means, on the backplane, for operatively coupling the microprocessor to the microprocessor memory and chip set on the feature card, and to the input/output bus.

2. The computer according to claim 1 wherein the means for removably connecting the feature card includes a pair of in-line connectors each identical to the microprocessor connector, one of the feature card connectors being adjacent the microprocessor connector and coupled via the backplane.

3. The computer according to claim 2 wherein microprocessor is a PENTIUM II and the connectors are Single Edge Contact Cartridge connectors.

4. The computer according to claim 3 wherein one of the in-line Single Edge Contact Cartridge connectors operatively couples the feature card and the PENTIUM II, and the other in-line Single Edge Contact Cartridge operatively couples the feature card to the backplane input/output bus.

5. The computer according to claim 1 wherein the feature card further comprises an on-board controller for an input/output device, and means for coupling to the device.

6. The computer according to claim 1 wherein the feature card further comprises an on-board controller for a monitor, and means for coupling to the monitor.

7. The computer according to claim 1 wherein the means for removably connecting the feature card includes an Single Edge Contact Cartridge connector adjacent the microprocessor's Single Edge Contact Cartridge connector, the two Single Edge Contact Cartridge connectors being coupled via the backplane.

8. The computer according to claim 7 wherein the means for removably connecting the feature card includes a pair of in-line Single Edge Contact Cartridge connectors, one being coupled to the microprocessor via the backplane and the other being coupled to the backplane input/output bus.

9. The computer according to claim 1 wherein the input/output bus comprises an Industry Standard Adapter bus.

10. The computer according to claim 1 wherein the input/output bus comprises a Peripheral Component Interconnect bus.

11. The computer according to claim 10 wherein the backplane further comprises an Industry Standard Adapter bus.

12. The computer according to claim 11 wherein the means for removably connecting the feature card includes two in-line connectors, one of the in-line connectors being adjacent the microprocessor connector and coupled therewith via the backplane.

13. The computer according to claim 12 wherein one of the in-line connectors operatively couples the feature card and the microprocessor, and the other in-line connector operatively couples the feature card to the Industry Standard Adapter and Peripheral Component Interconnect buses.

14. The computer according to claim 13 wherein microprocessor is a PENTIUM II and all the connectors are Single Edge Contact Cartridge connectors.

15. For a microprocessor and associated hardware having a torque arm which, if mounted on a vertically oriented printed circuit board, would unacceptably mechanically stress the circuit board, a computer backplane comprising:
 (a) a connector for coupling a feature card, the feature card comprising:
  (1) the microprocessor's memory,
  (2) the microprocessor's chip set,
  (3) but not a microprocessor;
 (b) a connector for coupling the microprocessor;
 (c) an input/output bus; and
 (d) means for operatively coupling the microprocessor and the feature card to each other and to the bus.

* * * * *